United States Patent
Welch et al.

(10) Patent No.: US 12,160,273 B2
(45) Date of Patent: Dec. 3, 2024

(54) MULTI-PROTOCOL OPTICAL DEVICE

(71) Applicant: Cisco Technology, Inc., San Jose, CA (US)

(72) Inventors: Brian P. Welch, San Diego, CA (US); Subal Sahni, La Jolla, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 18/073,438

(22) Filed: Dec. 1, 2022

(65) Prior Publication Data

US 2024/0187102 A1 Jun. 6, 2024

(51) Int. Cl.
*H04B 10/516* (2013.01)

(52) U.S. Cl.
CPC ................. *H04B 10/5161* (2013.01)

(58) Field of Classification Search
CPC .................. H04B 10/5053; H04B 10/5161
See application file for complete search history.

(56) References Cited

U.S. PATENT DOCUMENTS

| 9,509,410 | B2 | 11/2016 | Mateosky et al. |
| 2004/0091199 | A1 | 5/2004 | Goodfellow |
| 2009/0034985 | A1 | 2/2009 | Fattal et al. |
| 2017/0070297 | A1 | 3/2017 | Park et al. |
| 2019/0007157 | A1 | 1/2019 | Anderson |
| 2022/0095435 | A1 | 3/2022 | Xu et al. |
| 2023/0336248 | A1* | 10/2023 | Nagarajan .......... H04B 10/5161 |
| 2024/0045238 | A1* | 2/2024 | Wu ........................ G02F 1/212 |

FOREIGN PATENT DOCUMENTS

EP 3036869 A1 6/2016

* cited by examiner

*Primary Examiner* — Shi K Li
(74) *Attorney, Agent, or Firm* — Patterson + Sheridan, LLP

(57) ABSTRACT

An optical system includes a first optical source, a second optical source, a first optical modulator, and a second optical modulator. The first optical modulator includes a first input and a first output. The second optical modulator includes a second input, a third input, a second output, and a third output. During a first mode, the first optical source emits a first optical signal to the first input and the second input, the first optical modulator produces a first modulated optical signal at the first output, and the second optical modulator produces a second modulated optical signal at the second output. During a second mode, the second optical source emits a second optical signal to the third input and the second optical modulator produces a third modulated optical signal at the third output.

20 Claims, 7 Drawing Sheets

MULTI-PROTOCOL OPTICAL DEVICE

TECHNICAL FIELD

The present disclosure generally relates to optical devices. More specifically, embodiments disclosed herein relate to optical devices that can operate over multiple protocols.

BACKGROUND

Optical devices (e.g., optical transceivers) are used to transmit and receive optical signals in an optical system. These devices typically transmit and receive these optical signals according to different specifications. For example, different optical devices may support different optical polarization mode dispersion types.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
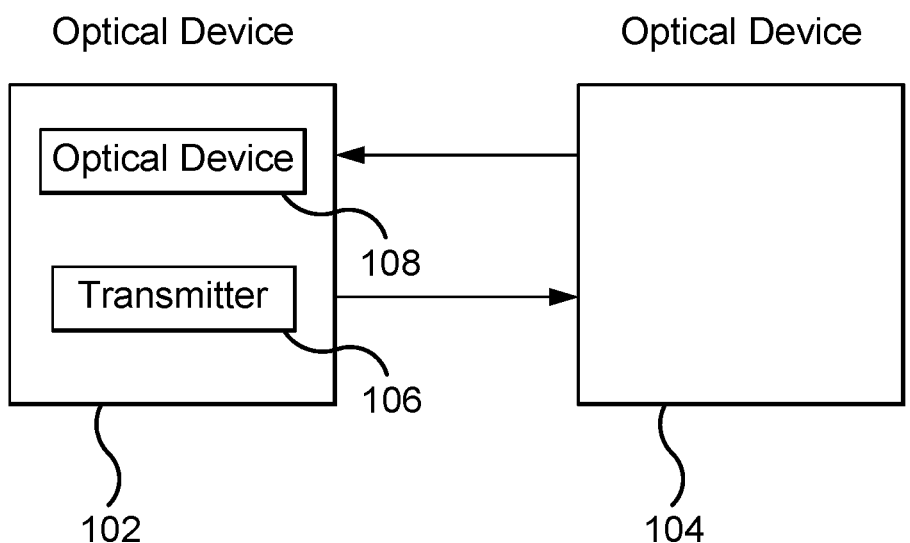
FIG. 1 illustrates an example optical system.

According to an embodiment, an optical system includes a first optical source, a second optical source, a first optical modulator, and a second optical modulator. The first optical modulator includes a first input and a first output. The second optical modulator includes a second input, a third input, a second output, and a third output. During a first mode, the first optical source emits a first optical signal to the first input and the second input, the first optical modulator produces a first modulated optical signal at the first output, and the second optical modulator produces a second modulated optical signal at the second output. During a second mode, the second optical source emits a second optical signal to the third input and the second optical modulator produces a third modulated optical signal at the third output.

According to another embodiment, a method includes emitting, during a first mode and by a first optical source, a first optical signal to a first input of a first optical modulator and to a second input of a second optical modulator and producing, during the first mode and by the first optical modulator, a first modulated optical signal at a first output of the first optical modulator. The method also includes producing, during the first mode and by the second optical modulator, a second modulated optical signal at a second output of the second optical modulator and emitting, during a second mode and by a second optical source, a second optical signal to a third input of the second optical modulator. The method further includes producing, during the second mode and by the second optical modulator, a third modulated optical signal at a third output of the second optical modulator.

According to another embodiment, an apparatus includes a memory and a processor communicatively coupled to the memory. The processor transitions to a first mode during which (i) a first optical modulator produces a first modulated optical signal based on a first optical signal from a first optical source and (ii) a second optical modulator produces a second modulated optical signal based on the first optical signal. The processor also transitions to a second mode during which the second optical modulator produces a third modulated optical signal based on a second optical signal from a second optical source.

Example Embodiments

Optical devices (e.g., optical transceivers and optical chips) transmit and receive optical signals according to certain specifications. For example, different optical devices may support different optical physical medium dependent (PMD) types. In existing systems, to change from a connection using a first specification to another connection using a different specification may involve changing optical devices that support the different specification.

The present disclosure describes an optical device that supports multiple protocols and specifications. For example, the optical device may support 400GBASE-DR4 and 400GBASE-FR4 PMD types. DR4 generally indicates a 500 meter reach (but can be different lengths) using a single-mode fiber with four optical fibers. FR4 generally indicates a 200 kilometer reach (but can be different lengths) using a single-mode fiber with four optical wavelengths. To switch between the different PMD types, the optical device switches the optical sources for some of the modulators in the optical device. Additionally, in one embodiment, the optical device includes different sets of grating couplers that are used depending on the desired PMD type. In this manner, the optical device can operate according to multiple protocols, which allows the device to support different types of connections, in certain embodiments.

FIG. 1 illustrates an example optical system 100. As seen in FIG. 1, the optical system 100 includes an optical device 102 and an optical device 104. Generally, the optical device 102 and the optical device 104 communicate optical signals between each other. The optical device 102 may communicate optical signals according to multiple, different protocols. The optical device 102 may change the protocol that the optical device 102 uses depending on the protocol used by the optical device 104.

The optical device 102 includes a transmitter 106 and a receiver 108. Generally, the transmitter 106 communicates one or more optical signal to the optical device 104. The transmitter 106 may communicate the optical signals according to multiple, different protocols. For example, the transmitter 106 may communicate optical signals with a 400GBASE-DR4 PMD type or a 400GBASE-FR4 PMD type. The protocol used by the transmitter 106 may be selected to match the protocol used by the optical device 104.

The receiver 108 may receive one or more optical signals from the optical device 104. Similar to the transmitter 106, the receiver 108 may be arranged to receive optical signals according to multiple different protocols. For example, the receiver 108 may receive optical signals with the DR4 PMD type, or the FR4 PMD type.

Figure 2:
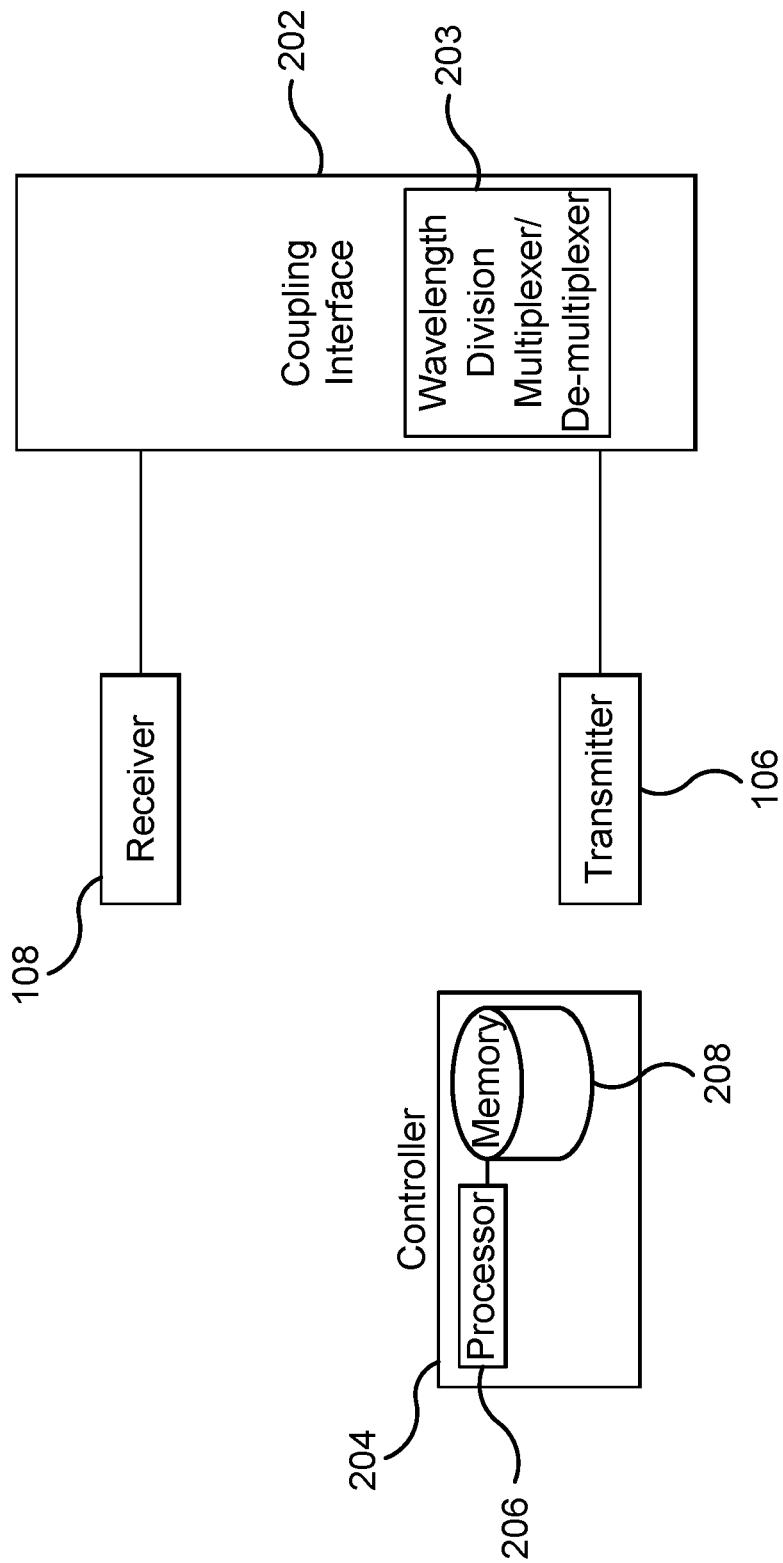
FIG. 2 illustrates an example optical device in the optical system of FIG. 1.

FIG. 2 illustrates an example optical device 102 in the optical system 100 of FIG. 1. As seen in FIG. 2, the optical device 102 includes the transmitter 106, the receiver 108, a coupling interface 202, and a controller 204. Generally, the controller 204 controls the operating mode of the optical device 102. For example, the controller 204 may switch the mode of the optical device 102 so that the optical device 102 communicates optical signals according to different protocols. As a result, the optical device 102 supports multiple, different optical PMD types, in certain embodiments.

As discussed above, the transmitter 106 and the receiver 108 may support optical communication over multiple, different link types. For example, the transmitter 106 and the receiver 108 may support both DR4 and FR4 PMD types. The transmitter 106 and the receiver 108 may support optical signals of a particular PMD type according to the operating mode of the optical device 102. For example, during a first operating mode of the optical device 102, the transmitter 106 and the receiver 108 may support optical signals with a DR4 PMD type, and during a second operating mode of the optical device 102, the transmitter 106 and the receiver 108 may support optical signals with an FR4PMD type.

The coupling interface 202 may be any suitable component that passes optical signals. For example, the coupling interface 202 may pass optical signals from the transmitter 106. The coupling interface 202 may also pass optical signals to the receiver 108. The coupling interface 202 may include multiple sets of grating couplers that direct optical signals from the transmitter 106 or to the receiver 108. Different sets of grating couplers may be used depending on the operational mode of the optical device 102.

In some embodiments, the coupling interface 202 performs wavelength division multiplexing and wavelength division de-multiplexing functions during certain operational modes. For example, the coupling interface 202 may include an integrated wavelength division multiplexer/de-multiplexer 203 that operates on optical signals with a FR4 PMD type. The coupling interface 202 may combine the optical signals from the transmitter 106 into a single beam, and the coupling interface 202 may split a received single beam into multiple optical signals for the receiver 108. By contrast, when the optical device 102 transmits and receives optical signals with a DR4 PMD type, the coupling interface 202 may pass each of the optical signals from the transmitter 106 as single beams, and the coupling interface 202 may pass multiple received beams to the receiver 108.

The wavelength division multiplexer/de-multiplexer 203 may be positioned in any suitable location. For example, the wavelength division multiplexer/de-multiplexer 203 may be positioned on-chip (e.g., within the coupling interface 202, as shown in FIG. 2). As another example, the wavelength division multiplexer/de-multiplexer 203 may be positioned off-chip. As yet another example, portions of the wavelength division multiplexer/de-multiplexer 203 may be positioned on-chip and portions of the wavelength division multiplexer/de-multiplexer 203 may be positioned off-chip.

The controller 204 controls the operation of the optical device 102. For example, the controller 204 may detect a type of optical device or receiver connected to the optical device 102. The controller 204 may then select the operational mode of the optical device 102 based on this detected type. In some embodiments, the controller 204 detects the PMD type expected by the connected receiver or optical device. The controller 204 then selects the operational mode of the optical device 102 so that the transmitter 106 and the receiver 108 communicate and receive optical signals according to the expected PMD type. For example, if the optical device 102 is connected to a different optical device or receiver that supports a different PMD type, the controller 204 may detect the different expected PMD type, and switch the operational mode of the optical device 102 so that the optical device 102 communicates and receives optical signals with the expected PMD type. As seen in FIG. 2, the controller 204 includes a processor 206 and a memory 208, which may be configured to perform the functions or actions of the controller 204 described herein. In some embodiments, the controller 204 does not include the processor 206 and the memory 208. Instead, the controller 204 includes switching circuitry that switches the operational mode of the system 100 based on received electric signals.

The processor 206 is any electronic circuitry, including, but not limited to one or a combination of microprocessors, microcontrollers, application specific integrated circuits (ASIC), application specific instruction set processor (ASIP), and/or state machines, that communicatively couples to memory 208 and controls the operation of the optical device 102. The processor 206 may be 8-bit, 16-bit, 32-bit, 64-bit or of any other suitable architecture. The processor 206 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 206 may include other hardware that operates software to control and process information. The processor 206 executes software stored on the memory 208 to perform any of the functions described herein. The processor 206 controls the operation and administration of the optical device 102 by processing information (e.g., information received from the transmitter 106, the receiver 108, and the memory 208). The processor 206 is not limited to a single processing device and may encompass multiple processing devices.

The memory 208 may store, either permanently or temporarily, data, operational software, or other information for the processor 206. The memory 208 may include any one or a combination of volatile or non-volatile local or remote devices suitable for storing information. For example, the memory 208 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 208, a disk, a CD, or a flash drive. In particular embodiments, the software may include an application executable by the processor 206 to perform one or more of the functions described herein.

Figure 3:
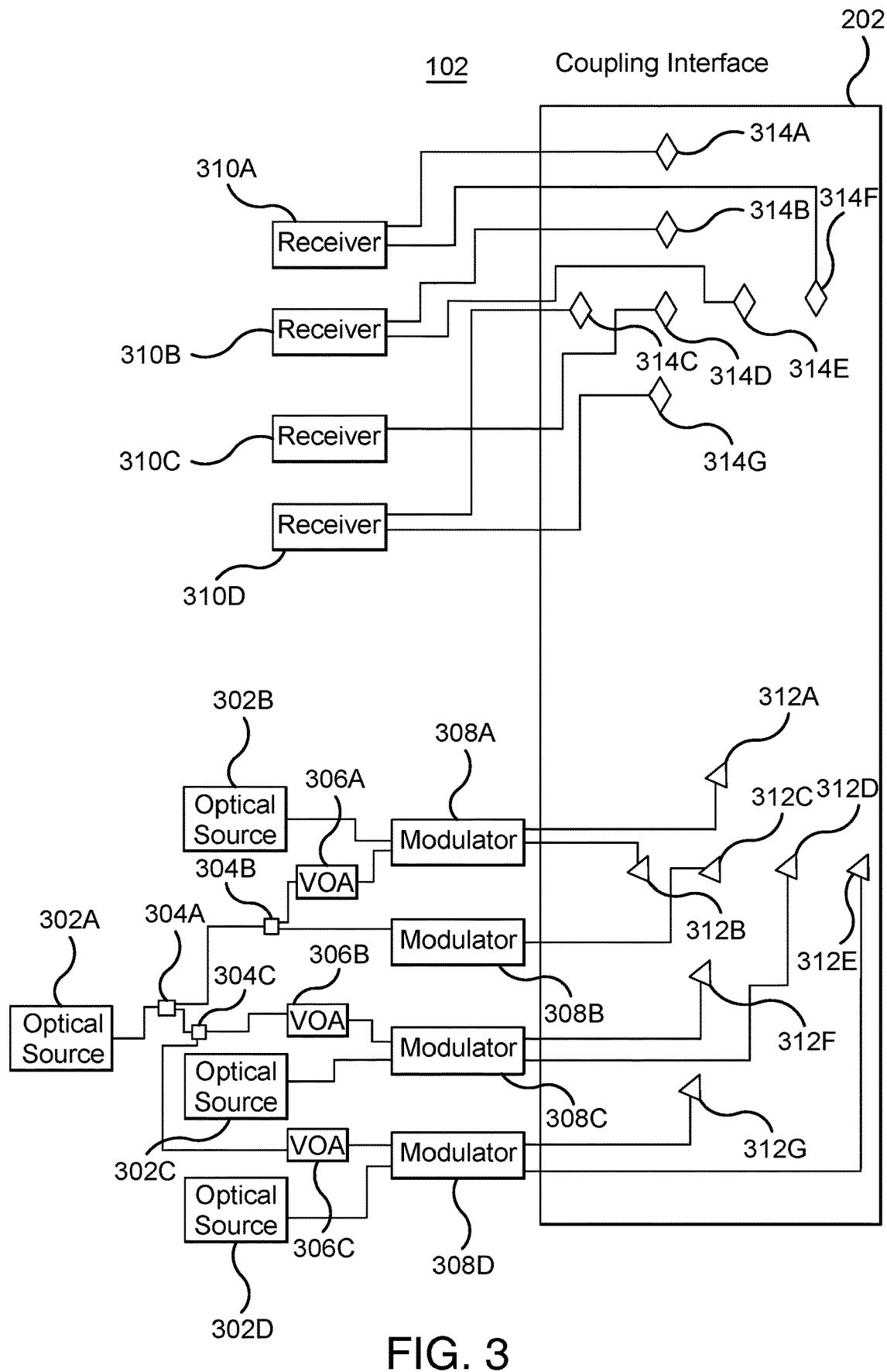
FIG. 3 illustrates an example optical device in the optical system of FIG. 1.

FIG. 3 illustrates an example optical device 102 in the optical system 100 of FIG. 1. As seen in FIG. 3, the optical device 102 includes one or more optical sources 302, one or more splitters 304, one or more variable optical attenuators (VOAs) 306, one or more optical modulators 308, one or more optical receivers 310, and the coupling interface 202. Generally, the optical sources 302, splitters 304, VOAs 306, and optical modulators 308 operate together to generate and transmit optical signals to the coupling interface 202. The optical receivers 310 operate together to receive optical signals from the coupling interface 202.

In the example of FIG. 3, the optical device 102 includes the optical sources 302A, 302B, 302C and 302D. The optical sources 302A, 302B, 302C, and 302D may generate and emit optical signals of different wavelengths to one or more of the optical modulators 308 in the optical device 102. In some embodiments, the optical sources 302B, 302C, and 302D may be turned on or off depending on the operational mode of the optical device 102.

In the example of FIG. 3, the optical device 102 includes the splitters 304A, 304B, and 304C. The splitter 304A receives an optical signal emitted by the optical source 302A. The splitter 304A then directs that optical signal to the splitters 304B and 304C. The splitter 304B directs the optical signal to the optical modulator 308B and the VOA 306A. The splitter 304C directs the optical signal to the VOA 306B and the VOA 306C. In this manner, the splitters 304A, 304B, and 304C may direct the optical signal from the optical source 302A to different optical modulators 308 in the optical device 102.

As seen in FIG. 3, the optical device 102 includes the VOAs 306A, 306B, and 306C. The VOA 306A receives an optical signal from the splitter 304B. The VOA 306B receives an optical signal from the splitter 304C. The VOA 306C receives an optical signal from the splitter 304C. Generally, the VOAs 306A, 306B, and 306C pass an optical signal during one operational mode of the optical device 102, and the VOAs 306A, 306B, and 306C attenuate or block the optical signal during another operational mode of the optical device 102. During the operational mode where the VOAs 306A, 306B, and 306C pass optical signals, the VOA 306A passes an optical signal to the optical modulator 308A, the VOA 306B passes an optical signal to the optical modulator 308C, and the VOA 306C passes an optical signal to the optical modulator 308D.

In the example of FIG. 3, the optical device 102 includes the optical modulators 308A, 308B, 308C, and 308D. The optical modulators 308A, 308B, 308C, and 308D receive optical signals from the optical sources 302A, 302B, 302C, and 302D. The optical modulators 308A, 308B, 308C, and 308D modulate these optical signals and communicate the modulated optical signals to the coupling interface 202. The optical signal received and modulated by the optical modulators 308A, 308B, 308C, and 308D may vary depending on the operational mode of the optical device 102. For example, during the first operational mode of the optical device 102, the optical modulators 308A, 308B, 308C, and 308D may receive an optical signal from the optical source 302A. During the second operational mode of the optical device 102, the optical modulator 308A may receive an optical signal from the optical source 302B, the optical modulator 308B may receive an optical signal from the optical source 302A, the optical modulator 308C may receive an optical signal from the optical source 302C, and the optical modulator 308D may receive an optical signal from the optical source 302D. As a result, the optical modulators 308A, 308B, 308C, and 308D may modulate different optical signals depending on the operational mode of the optical device 102.

In certain embodiments, the optical device 102 does not include the VOAs 306A, 306B, and 306C. Instead the splitters 304A, 304B, and 304C are tunable splitters that are adjusted or tuned to direct optical signals to different locations depending on the operational mode of the optical device 102. For example, during a first operational mode of the optical device 102, the splitters 304A, 304B, and 304C may be tuned to direct an optical signal from the optical source 302A to the optical modulators 308A, 308B, 308C, and 308D. In the second operational mode of the optical device 102, the splitters 304A, 304B, and 304C may be tuned to direct the optical signal from the optical source 302A only to the modulator 308B. As a result, the splitter 304B is tuned to direct the optical signal to the optical modulator 308B but not the optical modulator 308A, and the splitter 304C is tuned to block the optical signal.

As an example operation, during the first operational mode of the optical device 102, the optical source 302A may generate and emit an optical signal. The splitters 304A, 304B, and 304C may direct that optical signal to the VOAs 306A, 306B, and 306C and the optical modulator 308B. The VOAs 306A, 306B, and 306C may be set to pass the optical signal to the optical modulators 308A, 308C, and 308D. The optical modulators 308A, 308B, 308C, and 308D modulate the optical signal and communicate the modulated optical signal to the coupling interface 202.

During a second operational mode, the VOAs 306A, 306B, and 306C are switched to attenuate or block the optical signal from the optical source 302A. In embodiments where the optical device 102 does not include the VOAs 306A, 306B, and 306C, the splitter 304B is tuned to pass optical signals only to the optical modulator 308B, and the splitter 304C is tuned to block the optical signal from the optical source 302A. The optical sources 302B, 302C, and 302D may also be turned on to generate and emit optical signals to the optical modulators 308A, 308C, and 308D. As a result, the optical modulator 308A modulates the optical signal from the optical source 302B and directs the modulated optical signal to the coupling interface 202. The optical modulator 308B modulates the optical signal from the optical source 302A and directs the modulated optical signal to the coupling interface 202. The optical modulator 308C modulates the optical signal from the optical source 302C and directs the modulated optical signal to the coupling interface 202. The optical modulator 308D modulates the optical signal from the optical source 302D and directs the modulated optical signal to the coupling interface 202.

As seen in FIG. 3, the coupling interface 202 includes the grating couplers 312A, 312B, 312C, 312D, 312E, 312F, and 312G. Different sets of the grating couplers 312A, 312B, 312C, 312D, 312E, 312F, and 312 G may be used depending on the operational mode of the optical device 102. For example, during a first operational mode of the optical device 102, the optical modulator 308A directs a modulated optical signal to the grating coupler 312B, the optical modulator 308B directs a modulated optical signal to the grating coupler 312C, the optical modulator 308C directs a modulated optical signal to the grating coupler 312D, and the optical modulator 308D directs a modulated optical signal to the grating coupler 312E. During a second operational mode of the optical device 102, the optical modulator 308A directs a modulated optical signal to the grating coupler 312A, the optical modulator 308B directs a modulated optical signal to the grating coupler 312C, the optical modulator 308C directs a modulated optical signal to the grating coupler 312F, and the optical modulator 308D directs a modulated optical signal to the grating coupler 312G. As a result, different sets of the grating couplers 312 pass modulated optical signal through the coupling interface 202, depending on the operational mode of the optical device 102.

In some embodiments, the grating couplers 312A, 312C, 312F, and 312G are arranged to handle modulated optical signals with a DR4 PMD type. These modulated optical signals may be generated from the optical signal from the optical source 302A. The grating couplers 312A, 312C, 312F and 312G pass the modulated optical signals as separate beams to a connected optical device. Unwanted differential Mach-Zehnder Interferometer (MZI) outputs of the optical modulators 308A, 308B, 308C, and 308D may be filtered out by a primary path in a wavelength division multiplexer feature of the coupling interface 202. The grating couplers 312B, 312C, 312D, and 312E are arranged to handle modulated optical signals with a FR4 PMD type. These modulated optical signals may be generated from the optical signals from the optical sources 302A, 302B, 302C, and 302D. The wavelength division multiplexer feature of the coupling interface 202 combines these modulated optical signals into a single beam, and the single beam is communicated to a connected optical device.

In certain embodiments, the optical modulators 308A, 308C, and 308D include multiple inputs and multiple outputs to support a number of operational modes of the optical device 102. For example, if the optical device 102 operates according to two operational modes, then the optical modulators 308A, 308C, and 308D include two inputs and two outputs. Each input and output pair may be used during a different operational mode. For example, during a first operational mode of the optical device 102, the optical modulators 308A, 308C, and 308D may receive an optical signal from the optical source 302A at first inputs of the optical modulators 308A, 308C, and 308D. The optical modulators 308A, 308C, and 308D modulate these optical signals and direct the modulated optical signals through first outputs of the optical modulators 308A, 308C, and 308D. During a second operational mode of the optical device 102, the optical modulators 308A, 308C, and 308D receive optical signals from the optical sources 302B, 302C, and 302D at second inputs of the optical modulators 308A, 308C, and 308D. The optical modulators 308A, 308C, and 308D modulate these optical signals and direct the modulated optical signals through second outputs of the optical modulators 308A, 308C, and 308D. The different outputs of the optical modulators 308A, 308C, and 308D may be optically connected to different grating couplers 312 in the coupling interface 202. As a result, different grating couplers 312 pass modulated optical signals during different operating modes of the optical device 102. In some embodiments, the differential outputs of the MZIs of the optical modulators 308A, 308B, 308C, and 308D are used to drive the different sets of grating couplers 312.

In the example of FIG. 3, the optical device 102 includes the optical receivers 310A, 310B, 310C, and 310D. Each of the receivers 310A, 310B, 310C, and 310D receive an optical signal from the coupling interface 202 during an operational mode of the optical device 102. Each of the receivers 310A, 310B, 310C, and 310D may include a different input for each operational mode supported by the optical device 102. For example, each receiver 310A, 310B, 310C, and 310D may include two inputs if the optical device 102 supports two different operational modes.

The coupling interface 202 includes different sets of grating couplers 314 that pass optical signals to the receivers 310A, 310B, 310C, and 310D. In the example of FIG. 3, the coupling interface 202 includes the grating couplers 314A, 314B, 314C, 314D, 314E, 314F, and 314G. The grating couplers 314A and 314F are optically connected to the receiver 310A. The grating couplers 314B and 314E are optically connected to the receiver 310B. The grating coupler 314D is optically connected to the receiver 310C. The grating couplers 314C and 314G are optically connected to the receiver 310D. The receivers 310A, 310B, 310C, or 310D may use dual or quad input photodiodes to couple to multiple sets of the grating couplers 314.

During a first operational mode, the optical receivers 310A, 310B, 310C, and 310D may receive optical signals of a DR4 PMD type. These optical signals may be received as separate beams at the coupling interface 202. The receiver 310A may receive an optical signal through the grating coupler 314A, the receiver 310B may receive an optical signal through the grating coupler 314B, the receiver 310C may receive an optical signal through the grating coupler 314D, and the receiver 310D may receive an optical signal through the grating coupler 314G. During a second operational mode of the optical device 102, the optical receivers 310A, 310B, 310C, and 310D may receive optical signals of a FR4 PMD type. These optical signals may be received as a single beam at the coupling interface 202, and the wavelength division de-multiplexing feature of the coupling interface 202 may divide the single beam into the separate, optical signals. These optical signals are then passed to the grating couplers 314C, 314D, 314E, and 314F. The receiver 310A may receive an optical signal through the grating coupler 314F. The receiver 310B may receive an optical signal through the grating coupler 314E. The receiver 310C may receive an optical signal through the grating coupler 314D. The receiver 310D may receive an optical signal through the grating coupler 314C. As a result, the receivers 310A, 310B, 310C, and 310D may receive optical signals through different sets of the grating couplers 314 depending on the operational mode of the optical device 102.

Figure 4A:
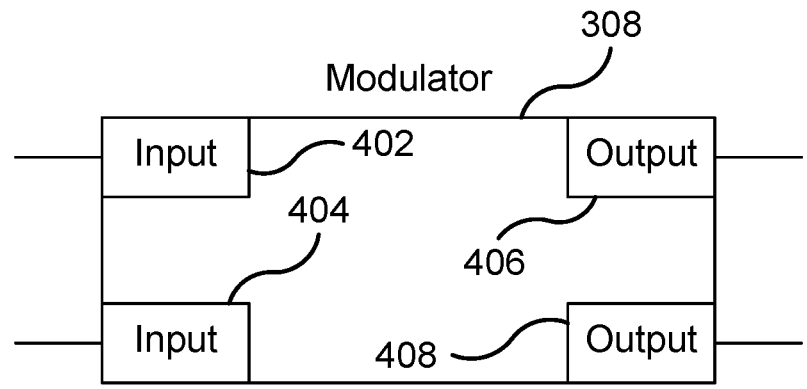
FIG. 4A illustrates an example modulator in the optical device of FIG. 2.

FIG. 4A illustrates an example optical modulator 308 in the optical device 102 of FIG. 2. The optical modulator 308 may include multiple inputs and outputs depending on the number of operational modes supported by the optical device 102. In the example of FIG. 4A, the optical modulator 308 includes the inputs 402 and 404 and the outputs 406 and 408. During a first operational mode, the optical modulator 308 may receive an optical signal at the input 402. The optical modulator 308 may modulate that optical signal and communicate the modulated optical signal through the output 406. During a second operational mode, the optical modulator 308 may receive an optical signal at the input 404. The optical modulator 308 may modulate the optical signal and communicate the modulated optical signal through the output 408.

Figure 4B:
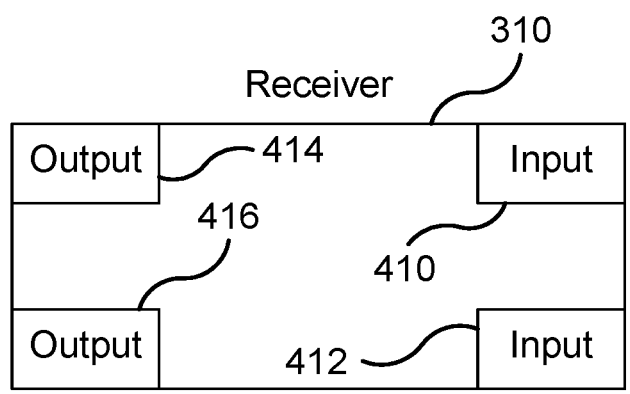
FIG. 4B illustrates an example receiver in the optical device of FIG. 2.

FIG. 4B illustrates an example optical receiver 310 in the optical device 102 of FIG. 2. The receiver 310 may include multiple inputs and outputs depending on the number of operational modes supported by the optical device 102. In the example of FIG. 4B, the receiver 310 includes the inputs 410 and 412 and the outputs 414 and 416. During a first operational mode, the receiver 310 may receive an optical signal at the input 410 and direct that optical signal through the output 414. During a second operational mode, the receiver 310 may receive an optical signal at the input 412 and direct that optical signal through the output 416.

Figure 5:
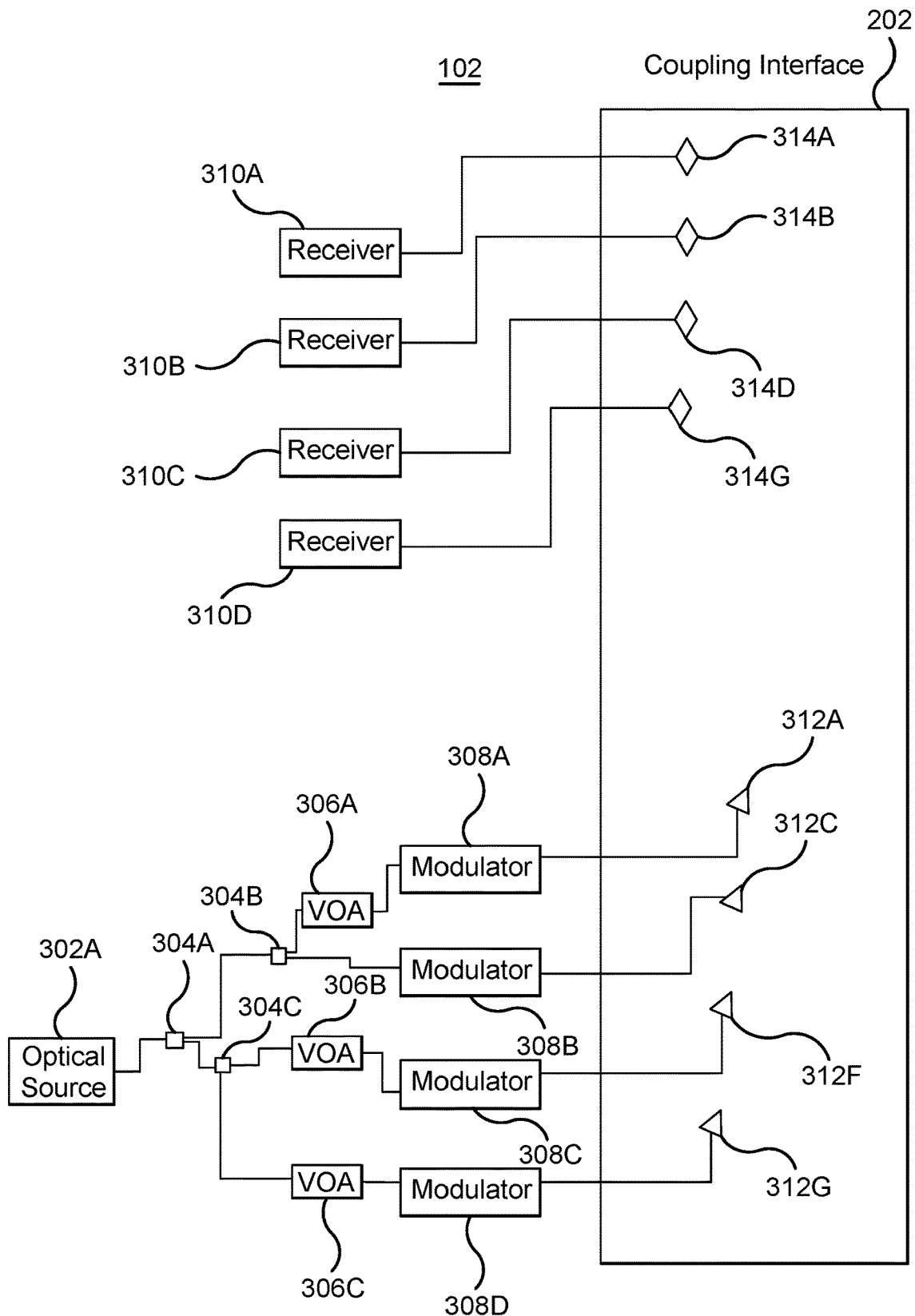
FIG. 5 illustrates an example optical device in the optical system of FIG. 1.

FIG. 5 illustrates an example optical device 102 in the optical system 100 of FIG. 1. Generally, FIG. 5 shows the operation of the optical device 102 during a first operational mode (e.g., to support signals with DR4 PMD type). As seen in FIG. 5, during the first operational mode, the optical source 302A emits an optical signal that is directed to each of the optical modulators 308A, 308B, 308C, and 308D. For clarity, the other optical sources 302B, 302C, and 302D, the grating couplers 312B, 312D and 312E, and the grating couplers 314C, 314E, and 314F are not illustrated in FIG. 5, but these components are still present in the optical device 102.

The splitters 304A, 304B, and 304C and the VOAs 306A, 306B, and 306C are set so that the splitters 304A, 304B, and 304C and the VOAs 306A, 306B, and 306C pass the optical signal from the optical source 302A to the optical modulators 308A, 308B, 308C, and 308D. In some embodiments, the optical signal from the optical source 302A is directed to first inputs of the optical modulators 308A, 308C, and 308D.

The optical modulators 308A, 308B, 308C, and 308D modulate the optical signal from the optical source 302A and direct the modulated optical signals to the grating couplers 312A, 312C, 312F, and 312G in the coupling interface 202. The optical modulator 308A may direct the modulated optical signal to the grating coupler 312A. The optical modulator 308B may direct the modulated optical signal to the grating coupler 312C. The optical modulator 308C may direct the modulated optical signal to the grating coupler 312F. The optical modulator 308D may direct the modulated optical signal to the grating coupler 312G. In some embodiments, the optical modulators 308A, 308C, and 308D may communicate the modulated optical signals through first outputs of the optical modulators 308A, 308C, and 308D.

The optical receivers 310A, 310B, 310C, and 310D receive optical signals through the grating couplers 314A, 314B, 314D, and 314G. The receiver 310A may receive optical signals through the grating coupler 314A. The receiver 310B may receive optical signals through the grating coupler 314B. The receiver 310C may receive optical signals through the grating coupler 314D. The receiver 310D may receive optical signals through the grating coupler 314G. In certain embodiments, the receivers 310A, 310B, and 310D receive optical signals at first inputs of the receivers 310A, 310B, and 310D.

Figure 6:
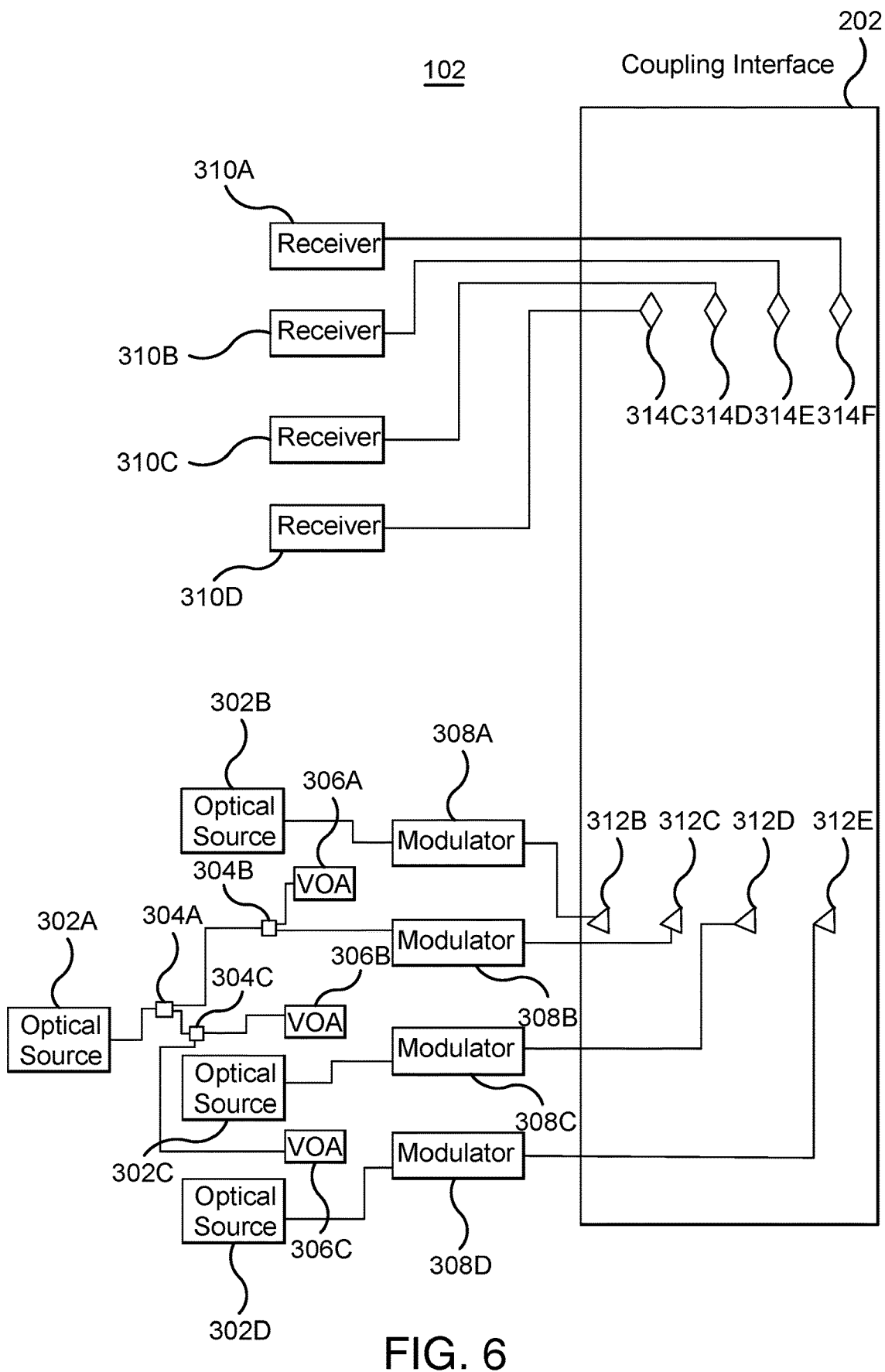
FIG. 6 illustrates an example optical device in the optical system of FIG. 1.

FIG. 6 illustrates an example optical device 102 in the optical system 100 of FIG. 1. Generally, FIG. 6 illustrates the operation of the optical device 102 during a second operational mode (e.g., to support signals with FR4 PMD type). For clarity, the grating couplers 312A, 312F, 312G, 314A, 314B and 314G are not illustrated in FIG. 6, but the grating couplers 312A, 312F, 312G, 314A, 314B and 314G are still present in the optical device 102.

As seen in FIG. 6, during the second operational mode, the optical sources 302B, 302C, and 302D are turned on, so that the optical sources 302B, 302C, and 302D generate and emit optical signals to the optical modulators 308A, 308C, and 308D. Additionally, the VOAs 306A, 306B, and 306C have been set to block the optical signal from the optical source 302A. As a result, the optical signal from the optical source 302A effectively does not reach the optical modulators 308A, 308C, and 308D. In embodiments where the optical device 102 does not include the VOAs 306A, 306B, and 306C, the splitters 304B and 304C are tuned to direct the optical signal from the optical source 302A. The splitter 304B may be tuned so that the splitter 304B passes the optical signal from the optical source 302A only to the optical modulator 308B. The splitter 304C may be tuned to block the optical signal from the optical source 302A. The optical modulators 308A, 308C, and 308D may receive the optical signals from the optical sources 302B, 302C, and 302D at second inputs of the optical modulators 308D.

The optical modulators 308A, 308B, 308C, and 308D modulate the optical signals and communicate the modulated optical signals to the grating couplers 312B, 312C, 312D, and 312E. The optical modulator 308A communicates the modulated optical signal to the grating coupler 312B. The optical modulator 308B communicates the modulated optical signal to the grating coupler 312C. The optical modulator 308C communicates the modulated optical signal to the grating coupler 312D. The optical modulator 308D communicates the modulated optical signal to the grating coupler 312E. In certain embodiments, the optical modulators 308A, 308C, and 308D communicate the modulated optical signals through second outputs of the optical modulators 308A, 308C and 308D. The wavelength division multiplexing feature of the coupling interface 202 may combine the modulated optical signals from the grating couplers 312B, 312C, 312D, and 312E into a single beam for transmission.

The receivers 310A, 310B, 310C, and 310D receive optical signals through the grating couplers 314C, 314D, 314E and 314F. The receiver 310A receives an optical signal through the grating coupler 314F. The receiver 310B receives an optical signal through the grating coupler 314E. The receiver 310C receives an optical signal through the grating coupler 314D. The receiver 310D receives an optical signal through the grating coupler 314C. In certain embodiments, the receivers 310A, 310B, and 310D receive optical signals at second inputs of the receivers 310A, 310B, and 310D. The optical signals may be received at the coupling interface 202 as a single beam. A wavelength division de-multiplexing feature of the coupling interface 202 splits the beam into the separate optical signals.

Figure 7:
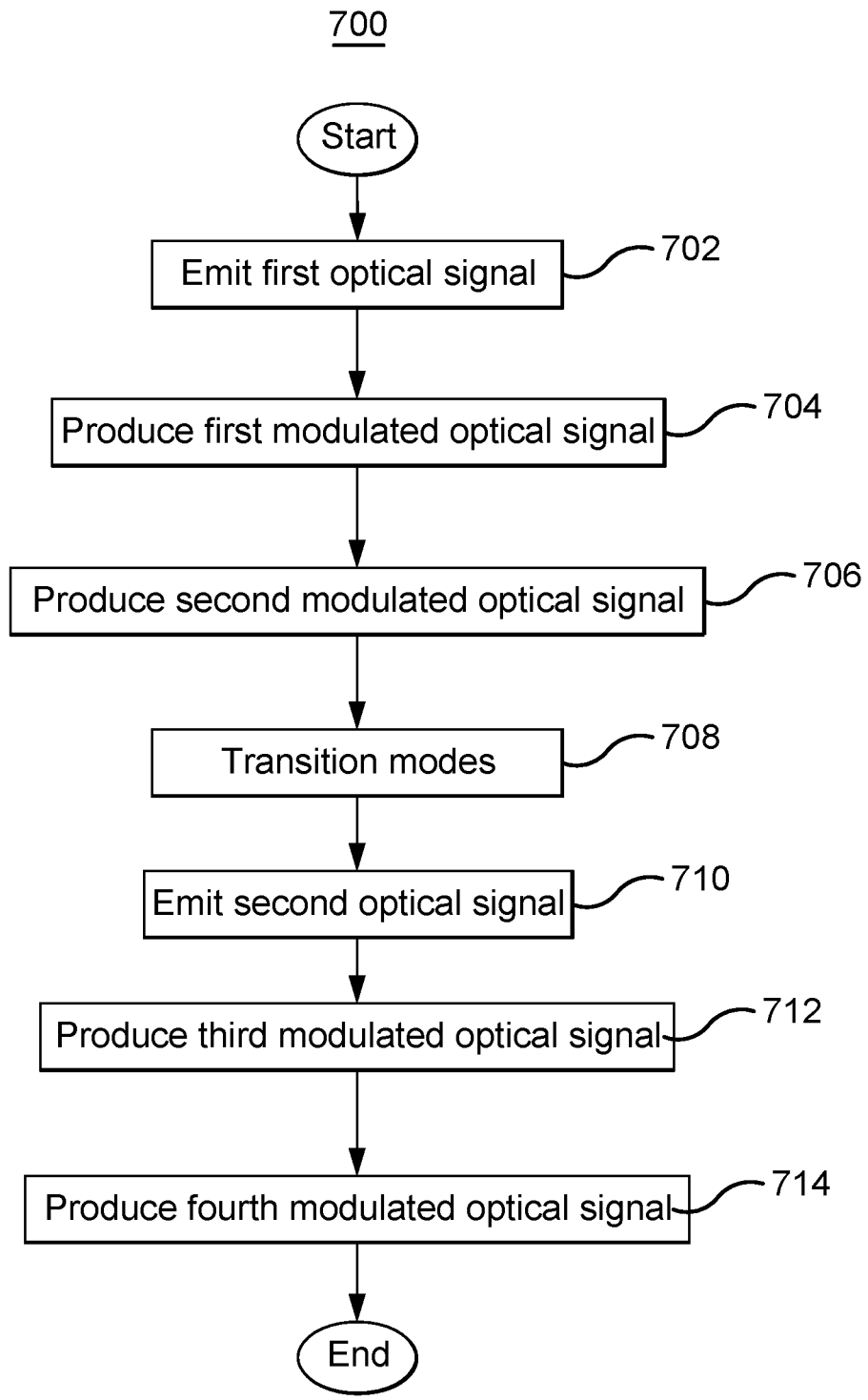
FIG. 7 is a flowchart of an example method performed in the optical system of FIG. 1.

FIG. 7 is a flowchart of an example method 700 performed in the optical system 100 of FIG. 1. In particular embodiments, various components of the optical device 102 perform the steps of the method 700. By performing the method 700, the optical device 102 communicates optical signals according to multiple different protocols. For example, the optical device may support multiple different optical PMD types.

The optical device 102 may begin by operating in a first operational mode to support optical signals with a particular optical PMD type (e.g., a DR4 PMD type). At block 702, the optical source 302A emits a first optical signal during a first operational mode. The splitters 304A, 304B, and 304C and the VOAs 306A, 306B, and 306C direct the optical signal to the optical modulators 308A, 308B, 308C, and 308D.

At block 704, the optical modulator 308B produces a first modulated optical signal by modulating the optical signal from the optical source 302A. The optical modulator 308B may output the modulated optical signal to the grating coupler 312C in the coupling interface 202. At block 706, the optical modulator 308A produces a second modulated optical signal by modulating the optical signal from the optical source 302A. The optical modulator 308A outputs the modulated optical signal to the grating coupler 312A in the coupling interface 202. The coupling interface 202 then communicates these modulated optical signals to another device as separate beams.

At block 708, the controller 204 of the optical device 102 transitions the operational mode of the optical device 102 from the first operational mode to a second operational mode to support optical signals with a different optical PMD type (e.g., a FR4 PMD type). In some embodiments, the controller 204 may transition modes in response to the controller 204 detecting the optical device 102 has connected to a device that communicates according to a different protocol. For example, the controller 204 may have detected that the optical device 102 has connected to a device that expects a different optical PMD type. In response, the controller 204 transitions the optical device 102 to the second operational mode. The controller 204 may cause the VOAs 306A, 306B, and 306C to begin attenuating or blocking optical signals. Additionally, the controller 204 may turn on the optical sources 302B, 302C, and 302D.

At block 710, the optical source 302B emits a second optical signal. The second optical signal may have a different wavelength than the optical signal emitted by the optical source 302A. The optical source 302B directs the optical signal to the optical modulator 308A. At block 712, the optical modulator 308B produces a third modulated optical signal by modulating the optical signal from the optical source 302A. The optical modulator 308B directs the modulated optical signal to the grating coupler 312C. At block 714, the optical modulator 308A produces a fourth modulated optical signal by modulating the optical signal from the optical source 302B. The optical modulator 308A outputs the fourth modulated optical signal to the grating coupler 312B. The coupling interface 202 may combine these modulated optical signals into a single beam for transmission using a wavelength division multiplexing feature of the coupling interface 202.

In summary, an optical device 102 supports multiple protocols and specifications. For example, the optical device 102 may support DR4 and FR4 PMD types. To switch between the different PMD types, the optical device 102 switches the optical sources 302 for some of the optical modulators 308 in the optical device 102. Additionally, the optical device 102 includes different sets of grating couplers 312 that are used depending on the desired PMD type. In this manner, the optical device 102 can operate according to multiple protocols, which allows the optical device 102 to support different types of connections, in certain embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical system comprising:
a first optical source;
a second optical source;
a first optical modulator comprising a first input and a first output;
a second optical modulator comprising a second input, a third input, a second output, and a third output, wherein during a first mode:
the first optical source is arranged to emit a first optical signal to the first input and the second input;
the first optical modulator is arranged to produce a first modulated optical signal at the first output; and
the second optical modulator is arranged to produce a second modulated optical signal at the second output; and
wherein during a second mode:
the second optical source is arranged to emit a second optical signal to the third input; and
the second optical modulator is arranged to produce a third modulated optical signal at the third output.

2. The optical system of claim 1, further comprising a wavelength division multiplexer optically coupled to the first optical modulator and the second optical modulator, wherein, during the first mode, the wavelength division multiplexer transmits the first modulated optical and the second modulated optical signal as separate beams, and wherein, during the second mode, the wavelength division multiplexer combines the first modulated optical signal and the third modulated optical signal into a single beam.

3. The optical system of claim 1, further comprising a variable optical attenuator coupled to the second input, wherein, during the first mode, the variable optical attenuator passes the first optical signal, and wherein, during the second mode, the variable optical attenuator attenuates the first optical signal.

4. The optical system of claim 1, wherein, during the first mode, the second optical source is turned off.

5. The optical system of claim 1, further comprising a tunable splitter coupled to the first input and the second input, wherein, during the first mode, the tunable splitter directs the first optical signal to the first input and the second input, and wherein, during the second mode, the tunable splitter directs the first optical signal to the first input rather than the second input.

6. The optical system of claim 1, further comprising a controller configured to transition between the first mode and the second mode based on a receiver type that receives the first modulated optical signal.

7. The optical system of claim 1, further comprising:
a first receiver comprising a fourth input; and
a second receiver comprising a fifth input and a sixth input, wherein during the first mode:
the first receiver receives a fourth modulated optical signal at the fourth input; and
the second receiver receives a fifth modulated optical signal at the fifth input; and
wherein during the second mode, the second receiver receives a sixth modulated optical signal at the sixth input.

8. The optical system of claim 1, wherein the first optical signal and the second optical signal have different wavelengths.

9. A method comprising:
emitting, during a first mode and by a first optical source, a first optical signal to a first input of a first optical modulator and to a second input of a second optical modulator;
producing, during the first mode and by the first optical modulator, a first modulated optical signal at a first output of the first optical modulator;
producing, during the first mode and by the second optical modulator, a second modulated optical signal at a second output of the second optical modulator;
emitting, during a second mode and by a second optical source, a second optical signal to a third input of the second optical modulator; and
producing, during the second mode and by the second optical modulator, a third modulated optical signal at a third output of the second optical modulator.

10. The method of claim 9, further comprising:
transmitting, during the first mode and by a wavelength division multiplexer optically coupled to the first optical modulator and the second optical modulator, the first modulated optical and the second modulated optical signal as separate beams; and
combining, during the second mode and by the wavelength division multiplexer, the first modulated optical signal and the third modulated optical signal into a single beam.

11. The method of claim 9, further comprising:
passing, during the first mode and by a variable optical attenuator coupled to the second input, the first optical signal; and
attenuating, during the second mode and by the variable optical attenuator, the first optical signal.

12. The method of claim 9, wherein, during the first mode, the second optical source is turned off.

13. The method of claim 9, further comprising:
directing, during the first mode and by a tunable splitter coupled to the first input and the second input, the first optical signal to the first input and the second input; and
directing, during the second mode and by the tunable splitter, the first optical signal to the first input rather than the second input.

14. The method of claim 9, further comprising transitioning, by a controller, between the first mode and the second mode based on a receiver type that receives the first modulated optical signal.

15. The method of claim 9, further comprising:
receiving, during the first mode, a fourth modulated optical signal at a fourth input of a first receiver;
receiving, during the first mode, a fifth modulated optical signal at a fifth input of a second receiver; and
receiving, during the second mode, a sixth modulated optical signal at a sixth input of the second receiver.

16. The method of claim 9, wherein the first optical signal and the second optical signal have different wavelengths.

17. An apparatus comprising:
a memory; and
a processor communicatively coupled to the memory, the processor configured to:
transition to a first mode during which (i) a first optical modulator produces a first modulated optical signal based on a first optical signal from a first optical source and (ii) a second optical modulator produces a second modulated optical signal based on the first optical signal; and
transition to a second mode during which the second optical modulator produces a third modulated optical signal based on a second optical signal from a second optical source.

18. The apparatus of claim 17, wherein, during a first mode, a variable optical attenuator coupled to the second optical modulator passes the first optical signal, and wherein, during the second mode, the variable optical attenuator attenuates the first optical signal.

19. The apparatus of claim 17, wherein, during the first mode, a tunable splitter coupled to the first optical modulator and the second optical modulator directs the first optical signal to the first optical modulator and the second optical modulator, and wherein, during the second mode, the tunable splitter directs the first optical signal to the first optical modulator rather than the second optical modulator.

20. The apparatus of claim 17, wherein the processor transitions between the first mode and the second mode based on a receiver type that receives the first modulated optical signal.

* * * * *